(12) United States Patent
Ulrich et al.

(10) Patent No.: US 8,720,064 B2
(45) Date of Patent: May 13, 2014

(54) COOLING FAN AND METHOD FOR PRODUCING A COOLING FAN

(75) Inventors: Jens Ulrich, Toluca (MX); Richard Vogt, Willstaett (DE); Klaus Linnenbrock, Buehl (DE); Thomas Helming, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 671 days.

(21) Appl. No.: 12/296,533

(22) PCT Filed: Sep. 6, 2007

(86) PCT No.: PCT/EP2007/059352
§ 371 (c)(1),
(2), (4) Date: Oct. 9, 2008

(87) PCT Pub. No.: WO2008/043619
PCT Pub. Date: Apr. 17, 2008

(65) Prior Publication Data
US 2009/0090314 A1    Apr. 9, 2009

(30) Foreign Application Priority Data

Oct. 6, 2006   (DE) .......................... 10 2006 047 393

(51) Int. Cl.
*H02K 13/04*   (2006.01)
(52) U.S. Cl.
USPC ........................ 29/890.035; 29/458; 29/889.3
(58) Field of Classification Search
USPC ......... 29/890.035, 897, 897.1, 888.02, 888.3,
29/889, 890.07, 890.09, 458, 527.2, 530
See application file for complete search history.

(56) References Cited

U.S. PATENT DOCUMENTS

| 6,170,275 B1 | 1/2001 | Ueno et al. | |
|---|---|---|---|
| 6,359,363 B1 * | 3/2002 | Foerstera et al. | 310/239 |
| 6,897,580 B2 | 5/2005 | White | |
| 6,983,529 B2 * | 1/2006 | Ortt et al. | 29/596 |
| 2002/0070009 A1 | 6/2002 | Vadrot et al. | |
| 2004/0135439 A1 * | 7/2004 | White | 310/51 |
| 2005/0023912 A1 * | 2/2005 | Lin et al. | 310/89 |

FOREIGN PATENT DOCUMENTS

| DE | 103 32 959 | 2/2005 |
|---|---|---|
| EP | 1 224 386 | 7/2002 |
| JP | 11-13684 | 1/1999 |
| JP | 2000-14072 | 1/2000 |
| WO | 01/99256 | 12/2001 |

* cited by examiner

*Primary Examiner* — David Bryant
*Assistant Examiner* — Christopher Besler
(74) *Attorney, Agent, or Firm* — Michael J. Striker

(57) ABSTRACT

The invention relates to a cooling fan for a cooling system of the internal combustion engine of a motor vehicle, the cooling fan comprising at least one frame (10) for retaining a fan motor and a fan motor (24) for driving a fan wheel (26). The invention is characterized in that at least one motor casing component of the fan motor (24) is injection-molded into the frame material and/or is coated by said material by injection molding when the frame (10) is formed. The invention also relates to a method for producing said cooling fan. The method according to the invention is characterized in that at least one motor casing of the fan motor (24) is injection-molded into the frame material and/or is coated by said material by injection molding when the frame (10) is formed.

7 Claims, 5 Drawing Sheets

COOLING FAN AND METHOD FOR PRODUCING A COOLING FAN

Figure 1:
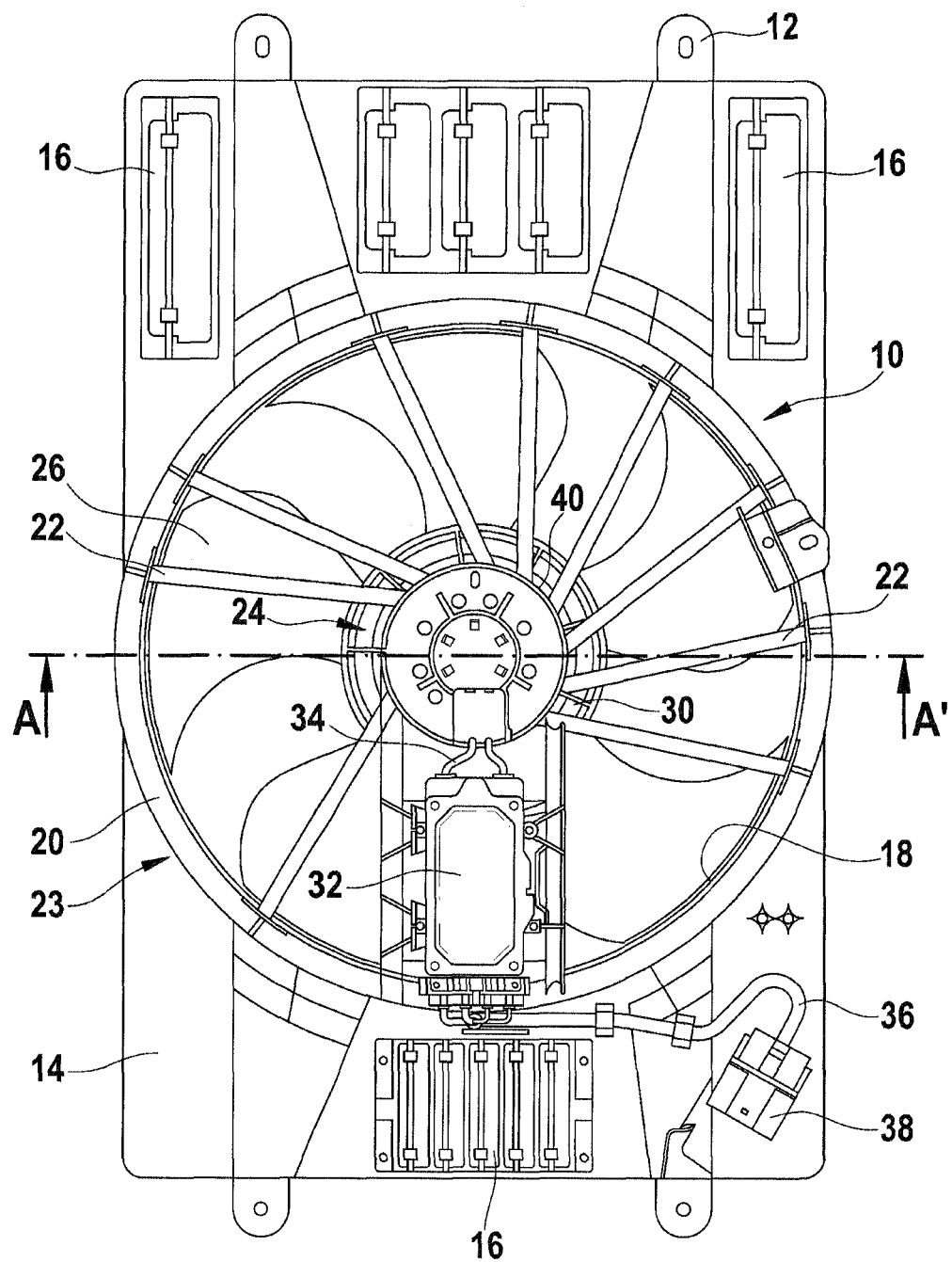

The present invention relates to a cooling fan or blower for a cooling system of an internal combustion engine of a motor vehicle, and to a method for manufacturing a cooling fan of this type.

RELATED ART

Blowers or fans that represent the general class are known in numerous embodiments, and they are used, in particular, as motor cooling fans, e.g., to increase the air throughput rate of a heat exchanger or a radiator element of a motor vehicle. The terms blower and fan are treated as synonyms within the framework of this application.

Electrically driven blowers and fans typically have a housing part, which is also referred to as a frame, that holds a centrally located electric motor via integrated braces. In addition to or instead of the braces, blades may also be provided, which conduct the air flow in conjunction with the frame. The blades may be located in front of or behind—in the direction of flow—an impeller ring that is driven by a motor shaft of the electric motor and that conveys air. To this end, the impeller ring includes several blades that are distributed around the circumference.

Publication DE 103 32 959 A1 makes known a fan for the coolant circuit of an internal combustion engine that is electrically operated. A distributor composed of circumferential supports connected by radial supports is integrally formed on an inner jacket of the frame of this fan described in DE 103 32 959 A1. The center of the distributor is formed by a retaining ring, on which an electric motor is attached via angular stays, in particular being screwed in place. The electric motor drives an impeller ring, which is non-rotatably connected with the motor shaft via a hub.

Publication EP 1 224 386 A1 makes known a cooling fan system for a motor vehicle that includes a fan, a motor that drives the fan, and a housing with a motor holder, on which the motor is mounted. The motor described in EP 1 224 386 A1 includes several connecting elements, which are designed as single pieces with the motor. The motor mount includes several recesses, which are sized and shaped such that they are capable of receiving the connector elements of the motor via a combined axial and rotational motion of the motor relative to the motor mount, of engaging therewith, thereby fixing the motor in position in the motor mount.

DISCLOSURE OF THE INVENTION

The inventive cooling fan makes it possible to fasten the fan motor in the frame of the fan in a simple, secure manner. According to the present invention, it is provided that at least one motor housing component of the fan motor is embedded at least partially in the material of the frame during the process of forming the frame, e.g., via injection or by enclosing this housing part in the material via injection molding.

Advantageously, the frame material may be composed of plastic, thereby easily enabling the motor and/or motor housing to be injected or enclosed via injection molding.

As a result, the motor no longer needs to be screwed or snapped in place in the frame. Instead, it may be integrated in the frame material, e.g., during the injection-molding process. In this manner it is possible for the motor and the frame to form a secure, unseparable unit.

It is therefore advantageously possible to eliminate—in particular—the part of the frame that encloses the motor, i.e., the motor ring, which is typically present otherwise.

Injecting the electric motor or at least a housing part of the electric motor into the frame therefore reduces the complexity of the cooling fan while simultaneously increasing its stiffness. Injecting the motor also simplifies assembly.

With the inventive method for manufacturing a cooling fan of this type, in the process of shaping the frame, at least one motor housing component of the fan motor is injected into the plastic material of the frame, or it is enclosed by the plastic material via injection molding. By injecting at least one housing motor component into the basic material of the cooling fan frame, it is possible to securely attach the electric motor in the frame of the cooling fan.

Advantageous refinements of the inventive device and/or the inventive method for manufacturing a device of this type are possible due to the features listed in the independent claims.

Advantageously, it is possible to inject, e.g., only the motor housing partially into the frame. This has the advantage that any damage that occurs to the motor electronic or electrical system due to the high temperatures of the injection-molding process may be limited to only a few parts of the motor housing. The motor, which is composed of a large number of individual elements, e.g., permanent magnets, windings, an armature and a motor shaft, may be installed and/or finalized after the motor housing or parts of the motor housing have been injected.

Advantageously, an essentially cylindrical housing component of the fan motor, e.g., the pole housing of the motor, may be injected or enclosed via injection molding.

In an advantageous embodiment of the present device, the essentially cylindrical motor housing component may be injected and/or enclosed via injection molding in an annular manner, at least on its outer circumferential surface. This makes it possible to securely fix the motor in position in the cooling fan frame and, in particular, to securely brace radial supports that are present in the cooling fan frame.

In alternative embodiments of the inventive cooling fan, radial supports of the cooling fan frame may be injection molded directly to the motor housing.

In addition to an essentially cylindrical housing component, e.g., the pole housing of the fan motor, one or more cover elements—in particular axial cover elements of the motor housing—may also be injected or enclosed via injection molding with the plastic material of the cooling fan frame.

In alternative embodiments of the inventive manufacturing procedure, the electric motor may also be installed in advance and then injected—as an assembled electric motor—into the plastic material of the frame or it may be enclosed via injection molding with the plastic material, in one of the manners described.

The motor housing may be connected with a fan wheel before or after the injection process.

In special embodiments of an inventive fan, it is possible to enclose the fan wheel itself in the motor housing via injection molding.

The connection between the motor and the motor housing and the frame of the cooling fan is established by injecting or enclosing the motor and/or the motor housing via injection molding. To prevent the motor and/or the motor housing and the injection-molded coating from coming loose, non-positive or form-fit connections are advantageously provided between the motor and/or the motor housing and the frame. Otherwise, the motor could come loose due to the different coefficients of expansion, in particular when the temperature increases. Since the basic material used to enclose via injection molding has the property of creeping in the temperature range, form-fit connections are preferred over non-positive connections.

Advantageously, it is therefore possible to provide projections, tabs, ribs, recesses or holes in the motor housing and, in particular, in the pole ring, which reliably prevent the electric motor from becoming detached and/or falling out after they are enclosed with plastic material via injection molding.

Further advantages of the inventive device and/or of the inventive manufacturing procedure of a device of this type result from the description, below, of a few exemplary embodiments, and from the associated drawing.

DRAWING

Exemplary embodiments of the inventive device are depicted in the drawing and are described in greater detail in the description below. The figures in the drawing, their descriptions, and the claims contain numerous features in combination. One skilled in the art will also consider the features individually and combine them to form further reasonable combinations. In particular, one skilled in the technical art will also combine the features of different exemplary embodiments to form further reasonable combinations.

Figure 2:
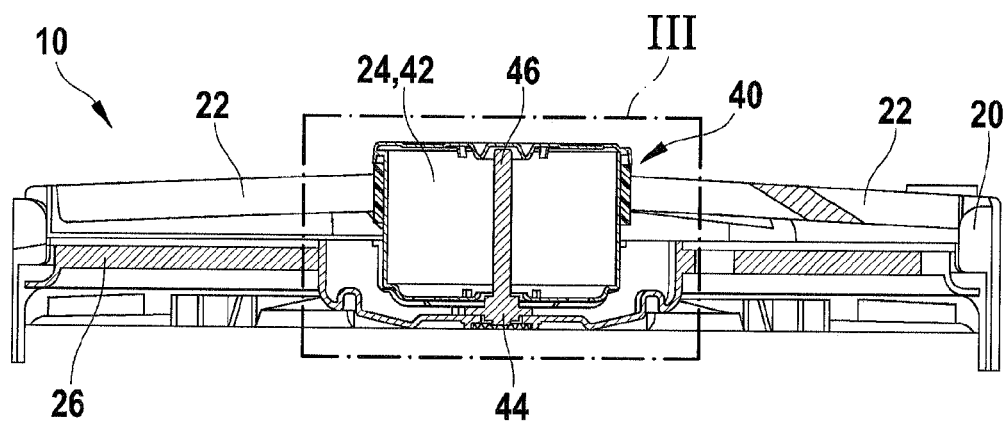
Figure 3:
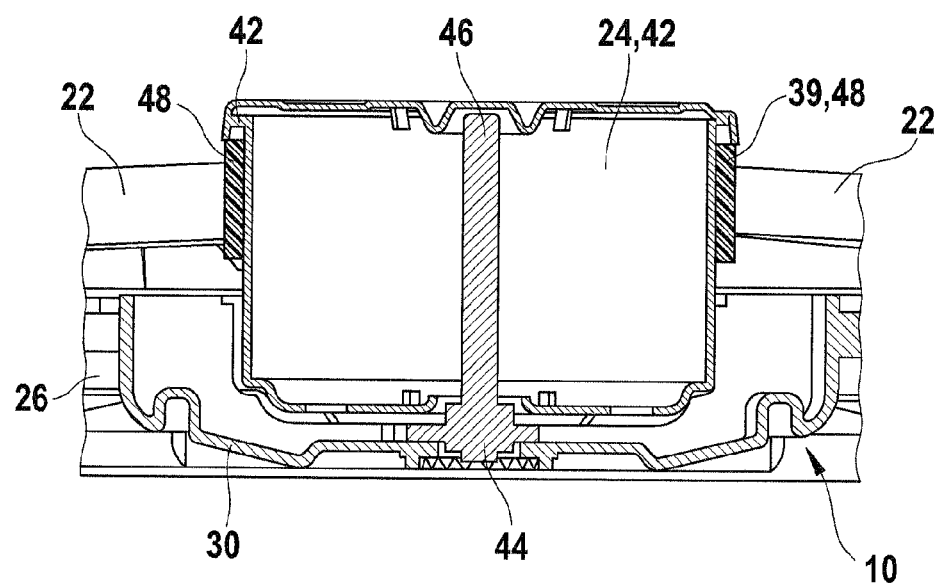

FIG. 1 shows a first exemplary embodiment of an inventive cooling fan, in an overview illustration, FIG. 2 shows a cross section through the cooling fan in FIG. 1, along axis AA', FIG. 3 shows a detailed view of FIG. 2 in the region of the connection between the electric motor and the cooling fan frame, FIG. 4 shows a detailed view of the connection between the motor housing and the frame, FIG. 5 shows an alternative design of the connection between the motor housing and the frame, FIG. 6 shows a further embodiment of the connection between the motor housing and the frame material.

DESCRIPTION OF THE EXEMPLARY EMBODIMENTS

FIG. 1 shows, as an overview, an underside view of a first embodiment of an inventive cooling fan. A cooling fan of this type is mounted, e.g., on the radiator of an internal combustion engine of a motor vehicle, and it covers the entire air-passage area of the radiator. The cooling fan is typically located on the rear—relative to the direction of air flow—side of the radiator, although it may also be located—in other cases—in front—relative to the direction of air flow—of the air-passage area of the radiator.

The cooling fan includes a frame 10, which is provided with fastening elements 12, in order to attach frame 10 and, therefore, the cooling fan, to a radiator and/or the body of a motor vehicle. Frame 10 is essentially composed of a closed frame cover 14, in which —in the exemplary embodiment shown in FIG. 1—air flaps 16 are located, in order to ensure an increased passage of air through frame cover 14, which is referred to below as a plenum. Frame 10 also includes an essentially circular opening 18, which is enclosed by a frame ring 20.

Frame cover 14 prevents air from passing through the region of the frame outside of fan opening 18 enclosed by frame ring 20. As a result, air that passes through the air-passage area of a radiator must pass entirely through fan opening 18 and, therefore, through fan wheel 26, provided that air flaps 16 are not open.

Frame 10 and, in particular, frame ring 20 includes braces 22, which serve to hold a fan motor 24, in particular to hold an electric motor in opening 18 of the frame. A fan or blower wheel 26 is operatively connected with electric motor 24 and includes sickle-shaped fan blades, which are interconnected at a central point via a fan hub 30, and which are connected with blower motor 24 driven by fan wheel.

The frame is essentially composed of plastic and is formed, e.g., using an injection-molding process.

An electronic control unit 32 is mounted on braces 22 of the fan holder, which is connected via electrical connection means 34 and 36 with the electric motor and with a plug element 38 attached to the frame, plug element 38 serving to electrically contact the cooling fan with, e.g., the electrical system of a motor vehicle. Electronic control unit 32 is not considered to be part of the frame itself.

Fan motor 24, which is essentially cylindrical in shape in the exemplary embodiment shown in FIG. 1, is enclosed in the plastic material of the frame via injection molding on its circumferential outer surface—which may be, e.g., the pole housing of the electric motor—and/or the electric motor is injection molded with at least parts of its motor housing in the plastic material of the frame. The plastic material used to enclose the fan motor via injection molding therefore advantageously forms a closed motor-retaining ring in the circumferential direction of the electric motor, the motor-retaining ring being connected as a single piece in particular with braces 22 of the frame, since the electric motor is enclosed directly in the plastic material of the frame or is injected into the plastic material during the process of forming the frame.

Fan holder 23 of the inventive cooling fan is therefore composed of two concentric rings, i.e., frame ring 20, which has the larger diameter and encloses fan wheel 26 with radial clearance, and a motor-retaining ring 40, which has the smaller diameter and encloses the motor housing of the fan motor in the circumferential direction. Concentric rings 20 and 40 are interconnected as single pieces via braces 26.

FIG. 2 shows a cross section through inventive cooling fan shown in FIG. 1 along a line AA' in FIG. 1. Electric motor 24 is connected via motor-retaining ring 40 and braces 22—which are formed as single pieces therewith—with frame ring 20 and, therefore, with the frame of the cooling fan. Motor-retaining ring 40 has been injection-molded around the essentially cylindrical motor housing in the circumferential direction, thereby ensuring that there is a solid connection between motor housing 42 and frame 10. In the exemplary embodiment shown in FIG. 2 and/or FIG. 1, motor-retaining ring 40 is injection-molded onto the motor housing only via a subregion of the axial expansion of the motor housing. In alternative embodiments, motor-retaining ring 40 may also be attached via injection molding across the entire axial length of the motor housing.

With the inventive method for manufacturing a cooling fan of this type, it is possible—depending on the requirements—to inject the fully-assembled electric motor, or only the motor housing or parts of the motor housing, e.g., the pole housing, into the plastic material of the frame in the process of forming the frame. The latter method has the advantage that motor components, e.g., the windings and bearings, are not exposed to the high thermal load associated with the process of forming the frame and the associated injection of the motor housing or the enclosing of the motor housing via injection molding. In a case such as this, only the motor housing or parts of the motor housing would be injected into the frame, and the motor would be installed subsequently in terms of its components.

Fan and/or blower wheel 26 may be connected with the motor before or after the electric motor or the electric motor housing is injected. A driving element 44 may be installed on shaft 46, e.g., for the fan wheel, as shown in FIG. 2.

It is also possible, however, to attach the fan wheel directly via injection molding, e.g., to a bearing cover or housing parts of the electric motor. This is advantageously possible, in particular, with outer-rotor motors of the type used in cooling fans.

FIG. 3 shows an alternative exemplary embodiment of an inventive cooling fan in a detailed view of the attachment of braces 22 to motor housing 42 of blower motor 24, which drives fan wheel 26. In contrast to the exemplary embodiment shown in FIGS. 1 and 2, plastic material 39 of frame 10 does not fully enclose electric motor 24 or motor housing 42 in the circumferential direction, but merely forms "foundations" 48, which are limited in the circumferential direction on the motor-side ends of braces 22. Every support 22 of an inventive cooling fan as shown in FIG. 3 therefore includes at least one plastic foundation 48, which is designed as a single piece with brace 22 and is attached to blower motor 24 and/or motor housing 42 via injection molding.

In alternative embodiments, it may also be provided that braces 22 are attached directly to the electric motor and/or the motor housing via injection molding, and e.g, that the use of a motor-retaining ring and/or foundations is eliminated.

Figure 4A:
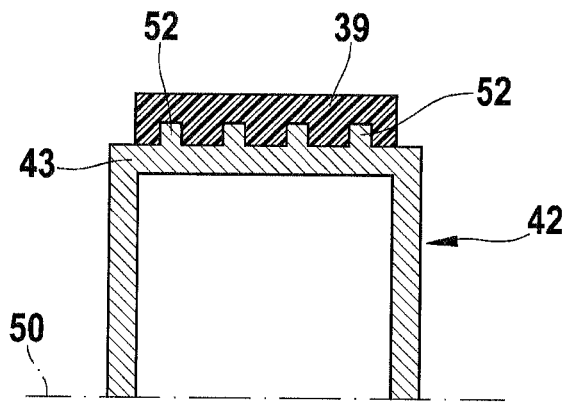
Figure 4B:
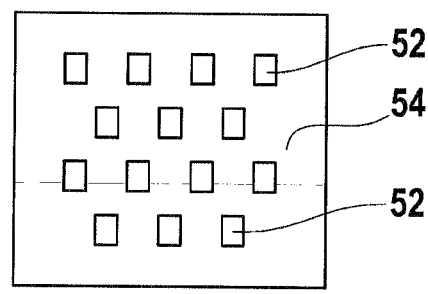

To prevent the motor and/or the motor housing and the injection-molded plastic coating from coming loose, it is provided in all embodiments that non-positive or form-fit connections are advantageously provided between the motor and/or the motor housing and the plastic material. A form-fit connection is preferred over a non-positive connection. FIGS. 4 through 6 show a few designs of a connection of this type in a schematic illustration; the connection is not limited to these types. FIG. 4a shows a cross-sectional view through one half of motor housing 42, in which case axis 50 essentially corresponds to the position of shaft 46. Projections 52 are formed on the motor housing and, in particular, in the region of pole housing 43. Projections 52 ensure an effective connection when the motor and/or the motor housing are injected or are enclosed via injection molding with the plastic material of the frame. The plastic material may be the motor-retaining ring that encloses the motor housing in the circumferential direction or foundation 48 that is bounded in the circumferential direction. FIG. 4b shows a schematic illustration of the jacket surface of the motor housing with fastening projections 52 located on jacket surface 54. Fastening projections 52 may be formed as single pieces with the motor housing, e.g., the pole housing, and they may be bent out of the motor housing or the pole housing, e.g., as tabs. In alternative embodiments, fastening projections 52 may also be attached to the motor housing as separate components.

Figure 5A:
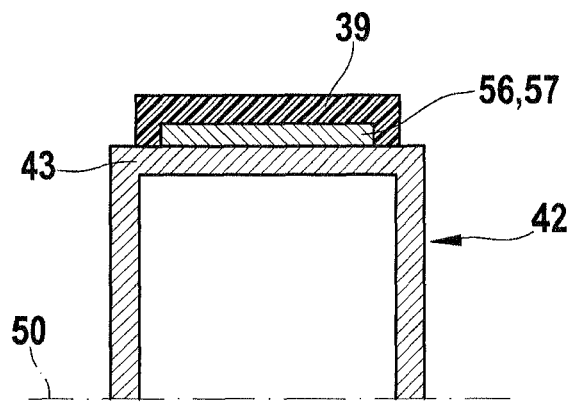
Figure 5B:
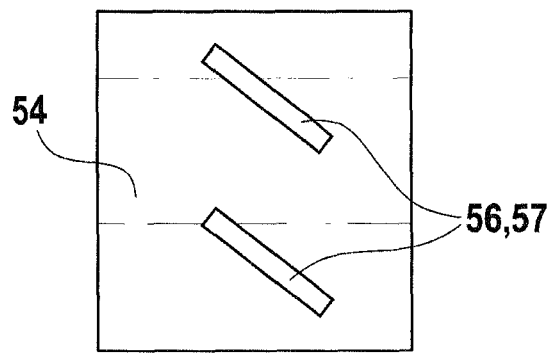
Figure 5C:
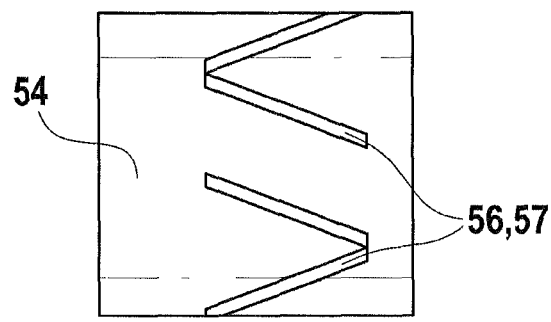

FIGS. 5a through 5c show an alternative embodiment of fastening means to improve the attachment of plastic material 39 to motor housing 42. In the embodiments shown in FIG. 5, the motor housing includes segments 56 on its jacket surface 54. Segments 56 are enclosed—via injection molding—with plastic material 39 of the frame when the motor housing and/or the motor are injected. These segments may also be formed with the motor housing, and they may be bent out of the motor housing, e.g., as tabs 57, or they may be attached and fastened to the motor housing from the outside.

FIG. 5b shows—in a schematic illustration of the jacket surface of the motor housing—the placement of parallel segments, which are distributed around the circumferential surface of the motor housing, e.g., at a constant distance or a non-constant distance from each other.

FIG. 5c shows, in a manner similar to that of FIG. 5b, the design of the fastening means in the form of segments or tabs positioned in the shape of a V, in particular. The V-shaped segments or tabs may be located in the same direction, or, as shown in FIG. 5c, in opposite directions around the circumference of the jacket surface of the motor housing, e.g., equidistantly or with a varying distance between them, and they may be injected into the plastic material or enclosed with the plastic material via injection molding in the process of forming the frame. The connection between fastening means 56 and 57 or 52 may also be enhanced by providing the radially raised projections or segments with perforations, which may be filled with the still-liquid plastic material during the forming process, thereby making it possible to realize an improved connection between the frame and the motor housing and/or the motor.

FIG. 6 shows, in a similar depiction, a further method for ensuring a secure connection of plastic material 39 of the frame with the motor and/or motor housing 42.

Figure 6A:
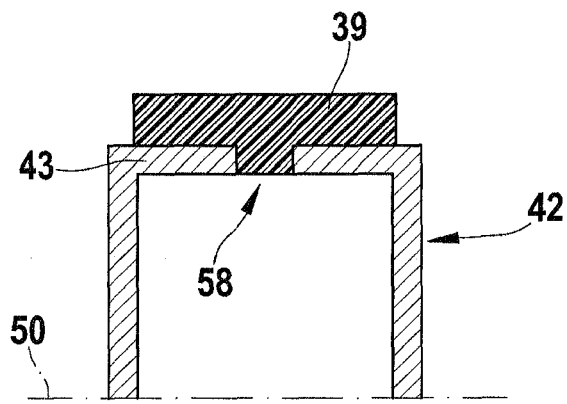
Figure 6B:
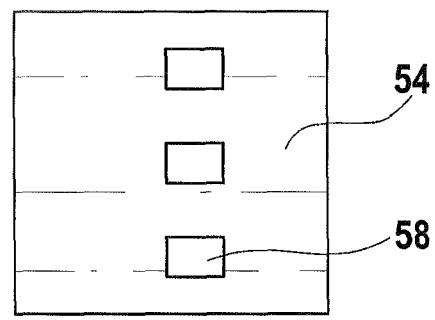
Figure 6C:
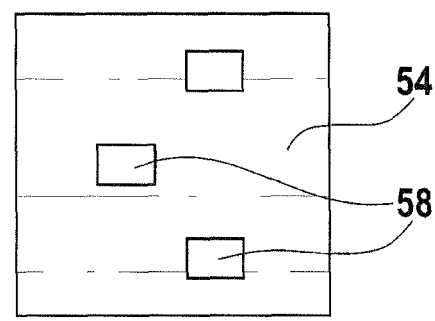

In this embodiment, the motor housing includes recesses, or, as shown in FIG. 6a, openings, into which plastic material 39 may flow in the process of forming the frame, in order to realize an improved connection between motor housing 42 and the frame. As shown in FIG. 6b, the openings and/or recesses 58 in the motor housing may be distributed equidistantly around the circumference of the jacket surface of the motor housing, or they may be formed in the motor housing with a varying distance between them. In alternative embodiments it is also possible—as shown in FIG. 6c—to form openings 58 in the jacket surface of the motor housing at a different axial distance.

The inventive cooling fan is not limited to the exemplary embodiment depicted in the figures. In particular, the plastic material of the frame may also be attached to or enclose—via injection molding—a bearing cover, in particular an axial bearing cover of the driving electric motor.

The inventive cooling fan is also not limited to the designs, number, and placement—as shown in the figures—of fastening means provided on the motor housing.

What is claimed is:

1. A method for manufacturing a cooling fan for a cooler of an internal combustion engine of a motor vehicle, said cooling fan comprising a fan wheel, a motor connected with the fan wheel to drive the fan wheel and having a motor housing, and a plastic frame for mounting the motor housing in the motor vehicle, said plastic frame connected with the motor housing and provided with a frame opening in which the fan wheel is arranged;

wherein said method comprises the steps of:
a) making said plastic frame of plastic material;
b) providing the motor housing with a plurality of connecting elements;
c) connecting said plastic frame with said motor housing by injecting frame material upon at least one part of the motor housing or by enclosing the motor housing with frame material via injection molding, wherein form-fit connections are formed between said plastic frame and said at least one part of the motor housing by said connecting elements enclosed with the plastic material via the injecting or injection molding;
d) prior to connecting of the at least one part of the motor housing with said plastic frame, connecting said motor housing with said fan wheel so that said fan wheel is drivable by said fan motor.

2. The method as recited in claim 1, further comprising performing said injecting or said enclosing via said injection molding so that the motor housing is formed as a substantially cylindrical housing component in an annular manner, at least on an outer circumferential surface thereof.

3. The method as recited in claim 1, further comprising making at least one axial cover element of the motor housing of the fan motor by a process selected from the group consisting of injecting and coating via injection molding.

4. The method as recited in claim 1, further comprising integrally molding supports of said plastic frame, which serve to secure the fan motor in the frame opening, with a motor housing via injection molding.

5. The method as recited in claim 1, further comprising installing motor components of the fan motor in the motor housing.

6. The method as recited in claim 1, further comprising making the fan motor by a process selected from the group consisting of injecting and coating via injection molding.

7. The method as recited in claim 1, wherein said connecting elements are selected from the group consisting of projections, tabs, ribs, recesses and holes in the motor housing.

\* \* \* \* \*